(12) United States Patent
Schoenfeld et al.

(10) Patent No.: US 9,315,651 B2
(45) Date of Patent: Apr. 19, 2016

(54) IMPACT RESISTANT MODIFIED COMPOSITIONS

(75) Inventors: Rainer Schoenfeld, Duesseldorf (DE); Andreas Taden, Duesseldorf (DE); Stefan Kreiling, Duesseldorf (DE); Claudia Mai, Duesseldorf (DE); Michael Kux, Monheim (DE); Harald Kuster, Duesseldorf (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 280 days.

(21) Appl. No.: 13/354,935

(22) Filed: Jan. 20, 2012

(65) Prior Publication Data

US 2012/0156487 A1    Jun. 21, 2012

Related U.S. Application Data

(63) Continuation of application No. PCT/EP2010/060959, filed on Jul. 28, 2010.

(30) Foreign Application Priority Data

Jul. 29, 2009   (DE) .......................... 10 2009 028 099

(51) Int. Cl.
| | |
|---|---|
| *C08F 283/00* | (2006.01) |
| *C08G 59/00* | (2006.01) |
| *C08G 59/40* | (2006.01) |
| *C08G 65/00* | (2006.01) |
| *D02G 3/00* | (2006.01) |
| *C09B 67/00* | (2006.01) |
| *C08K 5/357* | (2006.01) |
| *C08G 59/06* | (2006.01) |
| *C08G 59/68* | (2006.01) |
| *C08L 63/00* | (2006.01) |
| *C08L 71/00* | (2006.01) |

(52) U.S. Cl.
CPC .............. *C08K 5/357* (2013.01); *C08G 59/066* (2013.01); *C08G 59/686* (2013.01); *C08L 63/00* (2013.01); *C08L 71/00* (2013.01); *Y10T 428/2933* (2015.01)

(58) Field of Classification Search
CPC .... C08G 59/066; C08G 59/686; C08K 5/357; C08L 63/00; C08L 71/00; C08L 2666/22; Y10T 428/2933
USPC ............ 525/523; 528/403, 418, 98, 106, 118; 428/375; 106/287.21
See application file for complete search history.

(56) References Cited

U.S. PATENT DOCUMENTS

| | | | |
|---|---|---|---|
| 4,607,091 A | | 8/1986 | Schreiber |
| 5,021,484 A | | 6/1991 | Schreiber et al. |
| 5,200,452 A | | 4/1993 | Schreiber |
| 5,543,516 A | | 8/1996 | Ishida |
| 6,207,786 B1 | * | 3/2001 | Ishida et al. ................ 528/94 |
| 7,157,509 B2 | | 1/2007 | Li et al. |
| 2008/0302471 A1 | | 12/2008 | Tsuei |

FOREIGN PATENT DOCUMENTS

| | | | |
|---|---|---|---|
| EP | 1167484 A2 | 1/2002 | |
| GB | 2001324 A | * 1/1979 | ............. C08G 59/04 |
| JP | 2005239827 | 9/2005 | |
| WO | 2006035021 | 4/2006 | |
| WO | 2007064801 | 6/2007 | |
| WO | 2008063611 | 5/2008 | |
| WO | 2009115586 | 9/2009 | |

OTHER PUBLICATIONS

International Search Report issued in connection with International Patent Application No. PCT/EP2010/060959 mailed Dec. 2, 2010.
ASTM D790.
ASTM D5045-96.

* cited by examiner

*Primary Examiner* — William Cheung
(74) *Attorney, Agent, or Firm* — Steven C. Bauman

(57) ABSTRACT

The present invention relates to a polymerizable composition, containing at least one benzoxazine compound and certain oligomeric or polymeric urethane group-free polyether compounds. The present invention further relates to adhesives, sealants or coatings comprising the polymerizable composition according to the invention and the polymerization products of said composition.

19 Claims, No Drawings

IMPACT RESISTANT MODIFIED COMPOSITIONS

This application is a continued application of PCT/EP2010/060959, filed on Jul. 28, 2010, which claims priority to Germany Patent Application No. 10 2009 028 099.5, filed on Jul. 29, 2009.

The present invention relates to a polymerizable composition containing at least one benzoxazine compound and certain oligomeric or polymeric urethane group-free polyether compounds. The present invention also relates to adhesives, sealants or coatings comprising the polymerizable composition according to the invention, and to polymerization products of said composition.

Epoxide-based resin systems have long been successfully used in the aviation, automotive and electronics industry as adhesives, sealants or as surface coatings or used as resin systems with a range of different materials for producing composite materials.

Benzoxazine-based resin systems generally have a high glass transition temperature and high mechanical strength. Furthermore the cited materials are distinguished by their good electrical properties and their positive fire protection behavior.

As a general rule, the material properties of benzoxazine-based resin systems can be positively influenced by adding other resin components. U.S. Pat. Nos. 4,607,091, 5,021,484 and 5,200,452 disclose mixtures of epoxy resins and benzoxazine resins in this context. The addition of epoxy resins brings about a marked reduction in the overall viscosity of the mixture, resulting in an improved processability of the mixture.

One general disadvantage of benzoxazine-based resin systems lies in their fracture-mechanical properties. The materials are often very brittle after they have cured, and for most applications they have to be impact-modified by the addition of toughening agents.

Benzoxazine-based resin systems with improved impact modification are known from the prior art. Thus U.S. Pat. No. 7,157,509 describes heat-curable benzoxazine-based compositions comprising acrylonitrile-butadiene copolymers as toughening agents, the cited copolymers having terminal secondary amino groups.

The International patent application WO 2007/064801 teaches a curable composition comprising benzoxazine-based resin systems and certain adducts as toughening agents. The cited adducts are produced in two steps. In a first step a first compound containing hydroxyl groups is reacted with a compound containing isocyanate groups and a phenolic compound to form a reaction product containing urethane groups. In a second step the urethane group-containing reaction product is reacted further with epoxide-containing compounds to obtain the aforementioned adducts as toughening agents. Owing to the two-step reaction control, the toughening agent production process disclosed in WO 2007/064801 can be regarded as being capable of improvement from both a cost and an efficiency perspective. Furthermore, owing to environmental considerations it is desirable to avoid the use of isocyanates in the production of toughening agents.

The object of the present invention was therefore to provide a benzoxazine-based polymerizable composition containing at least one toughening agent that can be produced in a simple and cost-effective method from readily available raw materials without the use of isocyanates, wherein in its cured state the polymerizable composition has improved fracture-mechanical properties as compared with the prior art.

Surprisingly it has now been found that polymerizable compositions containing at least one benzoxazine compound can be impact-modified in an effective manner by the addition of certain oligomeric or polymeric urethane group-free polyether compounds as toughening agents, as a result of which in their cured form the polymerizable compositions have very good fracture-mechanical properties.

The present invention thus firstly provides a polymerizable composition comprising
i) at least one benzoxazine compound and
ii) at least one oligomeric or polymeric urethane group-free polyether compound, comprising one or more structural elements of the general formula (I),

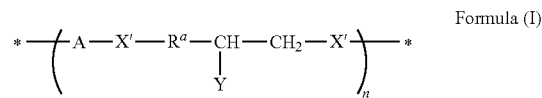

Formula (I)

in which n is a number from 5 to 10,000, each residue $R^a$ in each repeating unit independently denotes a divalent group of compounds comprising 1 to 100 C atoms, each residue X' in each repeating unit is independently selected from —O—, —S—, —NH— or a carboxyl group of the general form —(C═O)O—, in which the C atom of the carboxyl group is always connected to the residue A, each residue Y in each repeating unit is independently selected from —OH, —SH and —NH$_2$ and each residue A in each repeating unit is independently selected from K or L, K denoting a divalent residue of aromatic dihydroxyl compounds following removal of both hydroxyl groups and L denoting a divalent residue of polyethers following removal of two terminal hydroxyl groups, with the proviso that, relative to the total number of all residues A in the oligomeric or polymeric urethane group-free polyether compound, 20 to 80% of all residues A denote K and 20 to 80% of all residues A denote L.

The present invention also provides a polymerizable composition comprising
i) at least one benzoxazine compound and
ii) at least one oligomeric or polymeric urethane group-free polyether compound obtainable by reacting at least one component A with at least one component B,
component A being selected from the group consisting of (A-1) aromatic compounds having at least two aromatic hydroxyl, carboxyl, amino or thiol groups and (A-2) polyethers having at least two terminal hydroxyl, carboxyl, amino or thiol groups and component B being selected from the group consisting of (B-1) polyethers having at least two terminal oxirane, aziridine or thiirane groups and (B-2) aromatic compounds of the general formula (VIII)

Formula (VIII)

in which each residue $R^d$ and $R^e$ independently denotes a divalent group of compounds comprising 1 to 100 C atoms, each residue X' is independently selected from —O—, —S—, —NH— or a carboxyl group of the general form —(C═O)O—, in which the C atom of the carboxyl group is always connected to the residue D, W is selected from —O—, —S— or —NH— and the residue D comprises at least one aromatic group, with the proviso that the exclusive reaction of one or more component(s) satisfying the definition of (A-1) with one or more component(s) satisfying the definition of (B-2) and the exclusive reaction of one or more component(s) satisfying the definition of (A-2) with one or more component(s) satisfying the definition of (B-1) is excluded.

The polymerizable compositions of the present invention are exceptionally suitable for producing adhesives, sealants or coating agents and for producing composite materials comprising a layer or a bundle of fibers, such as carbon fibers for example.

The present invention therefore also provides adhesives, sealants or coating agents comprising the polymerizable composition according to the invention and the polymerization product of the composition according to the invention, wherein said polymerization product can be in contact with a layer or a bundle of fibers, such as carbon fibers for example.

The present invention also provides the use of one or more of the aforementioned oligomeric or polymeric urethane group-free polyether compounds as impact modifiers for a polymerization product containing at least one polymerizable benzoxazine compound in polymerized form.

The benzoxazine compound of the present invention is a monomer, oligomer or polymer comprising at least one benzoxazine group. Preferred monomers can preferably comprise up to four benzoxazine groups, wherein both individual monomers and mixtures of two or more monomers can be used as the benzoxazine compound.

Some polymerizable benzoxazine compounds comprising up to four benzoxazine groups are listed below.

Suitable benzoxazine compounds are preferably described by formula (B-I),

Formula (B-I)

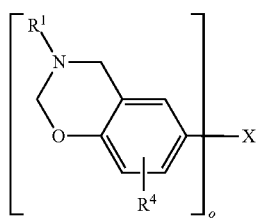

in which o is an integer number between 1 and 4, X is selected from the group consisting of alkyl (for o=1), alkylene (for o=2 to 4), oxygen (for o=2), thiol (for o=1), sulfur (for o=2), sulfoxide (for o=2), sulfone (for o=2) and a direct, covalent bond (for o=2), $R^1$ is selected from the group consisting of hydrogen, alkyl, alkenyl and aryl and $R^4$ is selected from the group consisting of hydrogen, halogen, alkyl and alkenyl, or $R^4$ is a divalent residue that makes a corresponding naphthoxazine structure from the benzoxazine structure.

Particularly preferred structures according to formula (B-I) are represented by formula (B-II), Formula (B-II)

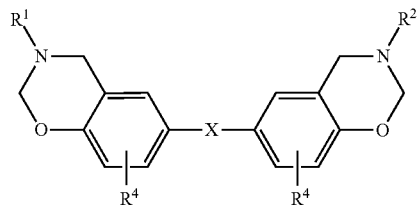

in which X is selected from the group consisting of $CH_2$, $C(CH_3)_2$, $C=O$, $O$, $S$, $S=O$, $O=S=O$ and a direct, covalent bond, $R^1$ and $R^2$ are identical or different and are each selected from the group consisting of hydrogen, alkyl, in particular methyl, ethyl, n-propyl, i-propyl, n-butyl or i-butyl, alkenyl, in particular allyl, and aryl, and the substituents $R^4$ are identical or different and are each selected from the group consisting of hydrogen, halogen, alkyl and alkenyl, or $R^4$ is a divalent residue that makes a corresponding naphthoxazine structure from the benzoxazine structure.

Preferred benzoxazine compounds according to formula (B-II) are for example benzoxazine compounds according to formula (B-III) to (B-VI), Formula (B-III)

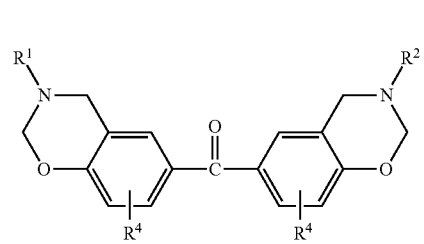

Formula (B-IV)

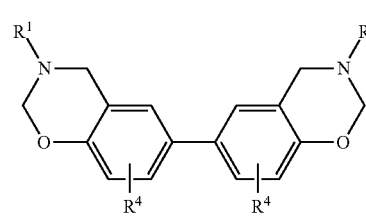

Formula (B-V)

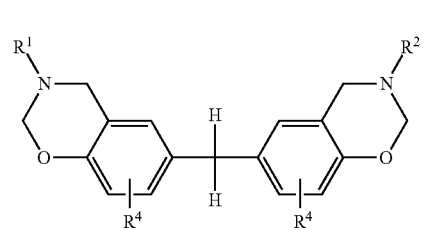

Formula (B-VI)

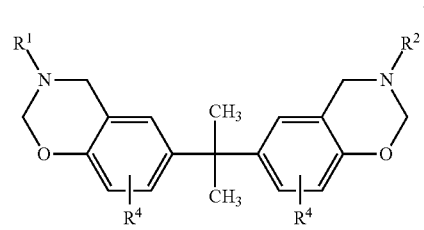

in which $R^1$, $R^2$ and $R^4$ are as defined in formula (B-I) and/or (B-II).

Preferred benzoxazine compounds are moreover compounds of the general formula (B-VII), Formula (B-VII)

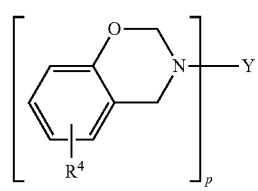

in which p=2 and Y is selected from the group consisting of biphenyl, diphenylmethane, diphenylisopropane, diphenylsulfide, diphenylsulfoxide, diphenylsulfone, diphenylketone and $R^4$ is selected from the group consisting of hydrogen, halogen, alkyl and alkenyl, or $R^4$ is a divalent residue that makes a corresponding naphthoxazine structure from the benzoxazine structure.

Likewise preferred benzoxazine compounds are moreover compounds of the general formula (B-VIII) to (B-X),

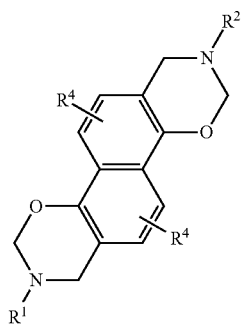
Formula (B-VIII)

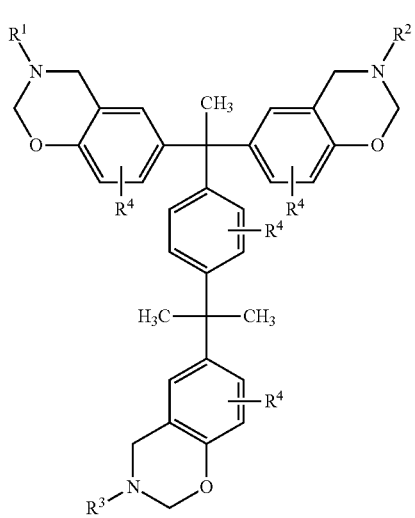
Formula (B-IX)

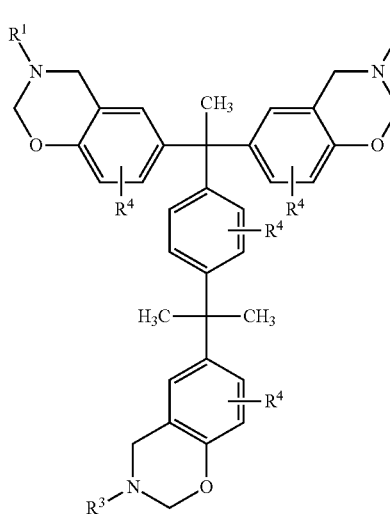
Formula (B-X)

in which $R^1$, $R^2$ and $R^4$ are as defined in formula (B-I) and/or (B-II) and $R^3$ is defined in the same way as $R^1$ or $R^2$.

Suitable benzoxazine compounds within the meaning of the present invention are for example the following compounds:

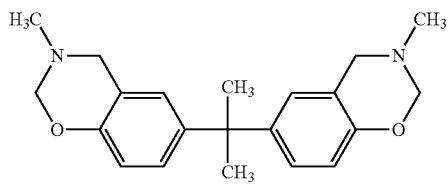
Formula (B-XI)

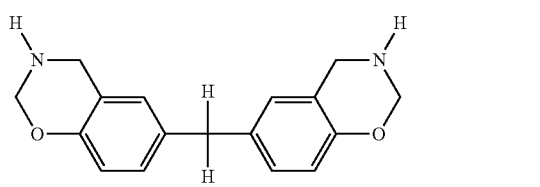
Formula (B-XII)

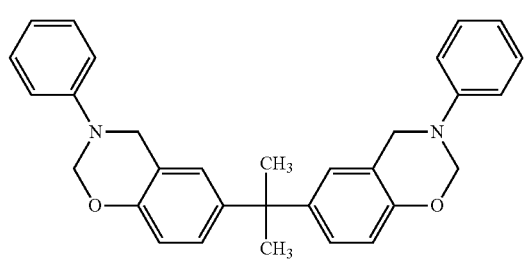
Formula (B-XIII)

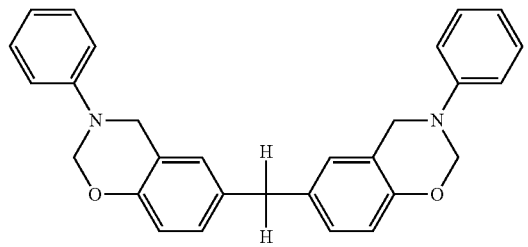
Formula (B-XIV)

Formula (B-XV)

Formula (B-XVI)

Formula (B-XVII)

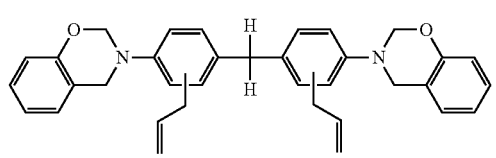

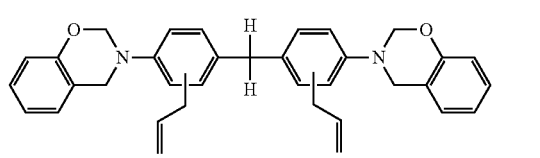
Formula (B-XVIII)

A further benzoxazine compound that can be used within the context of the present invention is selected from compounds of the formula (B-XIX),

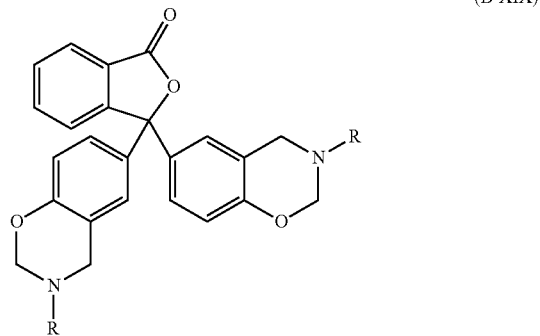

(B-XIX)

in which each R in formula (XIX) is independently selected from allyl, aryl, $C_1$-$C_8$ alkyl and $C_3$-$C_8$ cycloalkyl.

The aforementioned groups can be in substituted or unsubstituted form, suitable substituents being selected for example from amino, allyl and $C_1$-$C_8$ alkyl.

All residues R in formula (XIX) are preferably identical, R denoting a phenyl group in particular.

Suitable benzoxazine compounds within the meaning of the present invention are both monofunctional and polyfunctional benzoxazine compounds. Monofunctional benzoxazine compounds are understood to be compounds comprising only one benzoxazine group, whereas polyfunctional benzoxazine compounds comprise more than one benzoxazine group and can preferably contain up to four benzoxazine groups.

Monofunctional benzoxazine compounds can be described by way of example by the general formula (XIX),

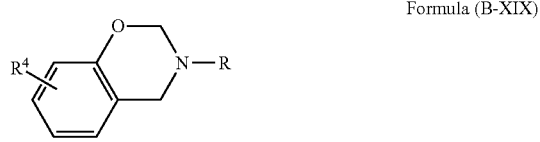

Formula (B-XIX)

wherein R in formula (B-XIX) is selected from the group consisting of alkyl, in particular methyl, ethyl, n-propyl, i-propyl, n-butyl, i-butyl, alkenyl, in particular allyl, and aryl, wherein each of the cited groups is optionally substituted and $R^4$ is selected from the group consisting of hydrogen, halogen, alkyl and alkenyl, or $R^4$ is a divalent residue that makes a corresponding naphthoxazine structure from the benzoxazine structure.

Preferred monofunctional benzoxazine compounds are described for example by the general formula (B-XX),

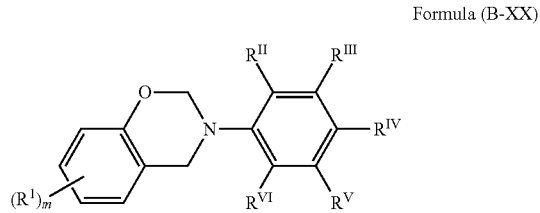

Formula (B-XX)

in which $R^I$ is selected from the group consisting of alkyl and alkenyl, wherein each of the cited residues is optionally substituted or interrupted by one or more O, N, S, C=O, COO or NHC=O or by one or more aryl groups, m is an integer number between 0 and 4 and $R^{II}$, $R^{III}$, $R^{IV}$, $R^V$ and $R^{VI}$ are selected independently of each other from the group consisting of hydrogen, alkyl and alkenyl, wherein each alkyl or alkenyl group is optionally substituted or interrupted by one or more O, N, S, C=O, COO or NHC=O or by one or more aryl groups.

Suitable monofunctional benzoxazine compounds within the meaning of the present invention are for example the following compounds (B-XXI) and (B-XXII),

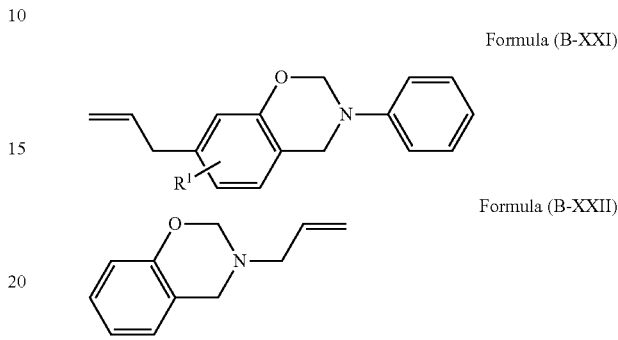

Formula (B-XXI)

Formula (B-XXII)

in which $R^I$ is defined as in formula (B-XX).

Benzoxazine compounds within the meaning of the present invention are commercially available and are sold inter alia by Huntsman Advanced Materials; Georgia-Pacific Resins, Inc. and Shikoku Chemicals Corporation, Chiba, Japan.

Notwithstanding that, the benzoxazine compounds according to the invention of the present invention can also be obtained by reacting a phenolic compound, for example bisphenol A, bisphenol F, bisphenol S or thiophenol, with an aldehyde, for example formaldehyde, in the presence of a primary alkylamine or arylamine. Suitable production methods are disclosed for example in U.S. Pat. No. 5,543,516, in particular in examples 1 to 19 in columns 10 to 14, wherein the reaction time for the corresponding reaction can last from a few minutes to a few hours, depending on the concentration, reactivity and reaction temperature. Further production possibilities for the benzoxazine compounds according to the invention can be obtained from U.S. Pat. Nos. 4,607,091, 5,021,484 and 5,200,452 and from the International patent application WO 2006/035021 A1.

In a preferred embodiment of the invention the polymerizable composition contains at least one polymerizable benzoxazine compound or a mixture of various polymerizable benzoxazine compounds in amounts from 20 to 90 wt. %, preferably from 30 to 80 wt. % and extremely preferably from 50 to 70 wt. %, relative in each case to the total amount of the preparation.

The polymerizable composition according to the invention moreover comprises at least one of the aforementioned oligomeric or polymeric urethane group-free polyether compounds.

A "polyether compound" within the meaning of the present invention is understood to refer to compounds containing four or more than four ether linkages.

Oligomeric polyether compounds contain 4 to 20 ether linkages, while polymeric polyether compounds comprise more than 20 ether linkages.

Within the meaning of the present invention the term "urethane group-free polyether compound" is understood to refer to oligomeric or polymeric polyether compounds whose polymer chains are substantially free from urethane groups (—NH—CO—O—). "Substantially free" means that the proportion of urethane groups relative to the molecular weight of a molecule of the oligomeric or polymeric polyether compound is less than 0.5%, preferably less than 0.25% and particularly preferably less than 0.1%.

In a preferred embodiment of the invention the oligomeric or polymeric polyether compound is completely free from urethane groups, such that the proportion of urethane groups relative to the molecular weight of each molecule of the oligomeric or polymeric polyether compound is 0%.

Urethane groups in a polymer chain are generally formed by the reaction of an alcohol with an isocyanate. Through the use according to the invention of the urethane group-free polyether compounds as impact modifiers, the use of isocyanate-containing compounds can substantially be dispensed with in their production. Furthermore, the polymerizable compositions according to the invention containing urethane group-free polyether compounds as toughening agents have a markedly reduced viscosity as compared with comparable compositions having urethane group-containing polyether compounds.

The viscosity of the polymerizable compositions according to the invention thus remains low, even if relatively large amounts of urethane group-free polyether compounds are used as impact modifiers.

In a preferred embodiment the oligomeric or polymeric urethane group-free polyether compound of the present invention has at least one terminal hydroxyl, carboxyl, amino or thiol group, preferably at least one terminal hydroxyl group, and/or at least one terminal oxirane, aziridine or thiirane group, preferably at least one terminal oxirane group. All terminal groups of the oligomeric or polymeric urethane group-free polyether compound of the present invention are selected in particular from hydroxyl, carboxyl, amino, thiol, oxirane, aziridine and/or thiirane groups, particularly preferably from hydroxyl and/or oxirane groups.

During curing of the polymerizable composition the terminal groups can react with the benzoxazine compound to form a covalent bond, resulting in a particularly effective binding of the toughening agent to the resin matrix. An improved impact modification of the cured polymerizable composition according to the invention is achieved in this way.

Preferred oligomeric or polymeric urethane group-free polyether compounds have a weight-average molecular weight from 1000 to 100,000 g/mol, preferably from 2000 to 8000 g/mol and particularly preferably from 3000 to 5000 g/mol.

Oligomeric or polymeric urethane group-free polyether compounds having a weight-average molecular weight below 1000 g/mol can act in the resin matrix as a plasticizer, causing polymerization products to be obtained that because of their fracture-mechanical properties and their comparatively low flexural moduli are unsuitable for most application purposes, in particular in composite materials.

Oligomeric or polymeric urethane group-free polyether compounds having a weight-average molecular weight above 100,000 g/mol generally have a very high viscosity. It is therefore possible for the aforementioned polyether compounds to exhibit a comparatively poor compatibility with the resin matrix.

The oligomeric or polymeric urethane group-free polyether compound of the present invention comprises one or more structural elements of the general formula (I),

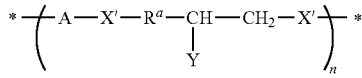

Formula (I)

in which n is a number from 5 to 10,000, each residue $R^a$ in each repeating unit independently denotes a divalent group of compounds comprising 1 to 100 C atoms, each residue X' in each repeating unit is independently selected from —O—, —S—, —NH— or a carboxyl group of the general form —(C=O)O—, in which the C atom of the carboxyl group is always connected to the residue A, each residue Y in each repeating unit is independently selected from —OH, —SH and —$NH_2$ and each residue A in each repeating unit is independently selected from K or L, K denoting a divalent residue of aromatic dihydroxyl compounds following removal of both hydroxyl groups and L denoting a divalent residue of polyethers following removal of two terminal hydroxyl groups, with the proviso that, relative to the total number of all residues A in the oligomeric or polymeric urethane group-free polyether compound, 20 to 80% of all residues A denote K and 20 to 80% of all residues A denote L.

Divalent residue K is formally obtained by removing two hydroxyl groups from aromatic dihydroxyl compounds. Within the meaning of the present invention aromatic dihydroxyl compounds are understood to be all compounds comprises two hydroxyl groups, each hydroxyl group being covalently bonded to a C atom of an aromatic or heteroaromatic ring system.

The two hydroxyl groups can be bonded either to the same or to two different aromatic or heteroaromatic ring systems.

Divalent residue L is formally obtained by removing two terminal hydroxyl groups from polyethers. Residue L thus comprises all divalent groups having the aforementioned chemical structure. It is obvious that the chemical structure of residue L can formally also be obtained in many other ways, for example by removing two terminal amino groups from amino-terminated polyethers. Such residues too naturally fall within the above definition of residue L.

Divalent residue L is preferably formally obtained by removing two terminal hydroxyl groups from "non-aromatic polyethers", wherein within the meaning of the present invention the term "non-aromatic polyethers" is understood to mean polyethers comprising no aromatic structural element.

In a further preferred embodiment of the invention divalent residue L is formally obtained by removing two terminal hydroxyl groups from polyalkylene oxides, non-aromatic polyalkylene oxides being particularly preferred.

The oligomeric or polymeric urethane group-free polyether compounds that comprise structural elements derived from non-aromatic polyethers and/or polyalkylene oxides as residue L exhibit a particularly good action as impact modifiers.

Where the oligomeric or polymeric urethane group-free polyether compound comprises a plurality of structural elements of the general formula (I), the cited structural elements can be identical or different and can be connected to one another by one or more groups of compounds of any kind. The individual group of compounds are identical or different and are preferably selected from covalent bonds and linear or branched di-, tri-, tetra-, penta- or polyvalent groups each comprising 1 to 100 C atoms.

The aforementioned groups of compounds are preferably selected from $C_{1-22}$ alkyls, in particular $C_{6-22}$ alkyls, $C_{2-22}$ alkenyls, in particular $C_{6-22}$ alkenyls, $C_{2-22}$ alkynyls, in particular $C_{6-22}$ alkynyls, $C_{6-8}$ cycloalkyls, $C_{3-22}$ heteroalkyls, $C_{4-22}$ heterocycloalkyls, $C_{6-14}$ aryls and $C_{6-14}$ heteroaryls.

All aforementioned groups of compounds can independently of one another each be substituted one or more times, in particular one, two or three times, preferably once, in particular by substituents selected from halogen, in particular chlorine, bromine or fluorine, trifluoromethyl, $C_{1-18}$ alkyl, $C_{3-8}$ cycloalkyl, $C_{2-18}$ alkenyl, $C_{2-18}$ alkynyl, heteroalkyl, heterocycloalkyl, $C_{1-18}$ alkoxy, $C_{1-18}$ alkylsulfanyl, $C_{1-18}$ alkylsulfonyl, $C_{1-18}$ alkylsulfoxidyl, $C_{1-18}$ alkanoyl, $C_{1-18}$ alkanoyloxy, $C_{1-18}$ alkoxycarbonyl, $C_{1-18}$ alkylaminocarbonyl, $C_{1-18}$ alkylsulfanylcarbonyl, sulfanyl, cyano, amino, heteroaryl, heteroaryl($C_{1-12}$ alkyl), heteroaryloxy, heteroarylamino, heteroarylsulfanyl, heteroarylsulfonyl, heteroarylsulfoxidyl, heteroarylcarbonyl, heteroarylcarbonyloxy, heteroaryloxycarbonyl, heteroarylaminocarbonyl, heteroarylsulfanylcarbonyl, $C_{1-18}$ alkoxysulfonyl, $C_{1-18}$ alkoxycarbinol, sulfo, sulfino, sulfeno, formyl, thioformyl, preferably by halogen, $C_{1-18}$ alkyl, $C_{2-18}$ alkenyl, $C_{2-18}$ alkynyl and $C_{1-18}$ alkoxy.

In a preferred embodiment the proportion of residue K relative to the total number of all residues A in the oligomeric or polymeric urethane group-free polyether compound is 30 to 70%, preferably 40 to 60% and in particular 45 to 55%. Oligomeric or polymeric urethane group-free polyether compounds containing the aforementioned proportions of residues K exhibit particularly good compatibility with the benzoxazine resin matrix.

In a further preferred embodiment the proportion of residue L relative to the total number of all residues A in the oligomeric or polymeric urethane group-free polyether compound is 30 to 70%, preferably 40 to 60% and in particular 45 to 55%. Oligomeric or polymeric urethane group-free polyether compounds containing the aforementioned proportion of residues L have a comparatively lower glass transition temperature $T_g$ and a reduced viscosity, giving rise to polymerizable compositions having particularly good processability.

The compatibility, viscosity and glass transition temperature of the oligomeric or polymeric urethane group-free polyether compound can be precisely adjusted by means of the appropriate choice of the percentages of residues K and L.

Furthermore, the impact strength, flexural properties and post-cure microstructure of the polymerization products according to the invention can be selectively controlled by means of the percentage ratios of residues K and L in the oligomeric or polymeric urethane group-free polyether compound as a function of the benzoxazine compound or mixture of various benzoxazine compounds used.

Within the context of the invention, oligomeric or polymeric urethane group-free polyether compounds are preferred in particular in which the proportion of all structural elements of formula (I) relative to the weight-average molecular weight of the oligomeric or polymeric urethane group-free polyether compound is 40 to 99.99%, preferably 70 to 99% and in particular 85 to 98%.

Oligomeric or polymeric urethane group-free polyether compounds containing the aforementioned proportions of structural elements of formula (I) make it possible to achieve a particularly effective impact modification of the cured polymerizable compositions according to the invention.

The individual structural elements of the general formula (I) can be aligned or linked together in such a way that they form a linear oligomeric or polymeric urethane group-free polyether compound of the present invention and/or are a constituent of such a compound.

Alternatively, the individual structural elements of the general formula (I) can be aligned or linked together in such a way that they form a branched oligomeric or polymeric urethane group-free polyether compound of the present invention and/or are a constituent of such a compound.

Within the context of the present invention, preferred oligomeric or polymeric urethane group-free polyether compounds are selected from compounds of the general formula (II),

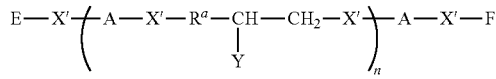

Formula (II)

in which E is selected from hydrogen or residues of the general formula (III),

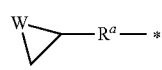

Formula (III)

F is selected from hydrogen or residues of the general formula (IV),

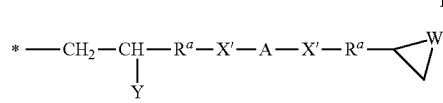

Formula (IV)

in which each residue W in formula (III) and (IV) is independently selected from —O—, —S— or —NH—, in which W denotes in particular —O—, n is a number from 5 to 10,000, each residue $R^a$ in each repeating unit and in formula (II), (III) and (IV) independently denotes a divalent group of compounds comprising 1 to 100 C atoms, each residue X' in each repeating unit and in formula (II) and (IV) is independently selected from —O—, —S—, —NH— or a carboxyl group of the general form —(C=O)O—, in which the C atom of the carboxyl group is always connected to the residue A, each residue Y in each repeating unit and in formula (IV) is independently selected from —OH, —SH and —NH$_2$ and each residue A in each repeating unit and in formula (IV) is independently selected from K or L, K denoting a divalent residue of aromatic dihydroxyl compounds following removal of both hydroxyl groups and L denoting a divalent residue of polyethers following removal of two terminal hydroxyl groups, wherein, relative to the total number of all residues A in the oligomeric or polymeric urethane group-free polyether compound, 20 to 80% of all residues A denote K and 20 to 80% of all residues A denote L.

The properties of the urethane group-free polyether compound can be altered by means of the number of repeating units, making it possible to selectively adapt the aforementioned polyethers to a defined benzoxazine matrix. Therefore n in formula (I) and (II) preferably denotes a number from 3 to 20, particularly preferably a number from 5 to 15 and extremely preferably a number from 7 to 10.

In preferred embodiments of the present invention each residue $R^a$ in formula (I), (II), (III) and/or (IV) is independently selected from alkylene groups containing 1 to 10 C atoms. In particular $R^a$ is selected from linear alkylene groups comprising 1 to 6, in particular 1 or 2 carbon atoms, such as for example methylene and ethylene groups, $R^a$ particularly preferably denoting a methylene group in the aforementioned formulae.

In a further preferred embodiment of the present invention each residue X' in formula (I), (II) and/or (IV) independently denotes —O—. This can be achieved in particular by using aromatic substances having at least two aromatic hydroxyl groups and/or polyethers having at least two terminal hydroxyl groups in the production of the urethane group-free polyether compounds of the present invention. The use of the aforementioned substances is advantageous because they can be produced cost-effectively or are commercially available in a wide variety of structures.

It is furthermore preferable for residue Y in formula (I), (II) and/or (IV) to denote —OH. This can be achieved in particular by using substances having terminal oxirane groups in the production of the urethane group-free polyether compounds of the present invention. The use of the aforementioned substances is advantageous because they can be produced cost-effectively and are commercially available in a wide variety of structures.

Divalent residue K is formally obtained by removing two hydroxyl groups from aromatic dihydroxyl compounds. Preferred residues K in each repeating unit and in each of the formulae (I), (II) and optionally (IV) are selected independently of one another from divalent residues of the general formula (V) and/or formula (VI),

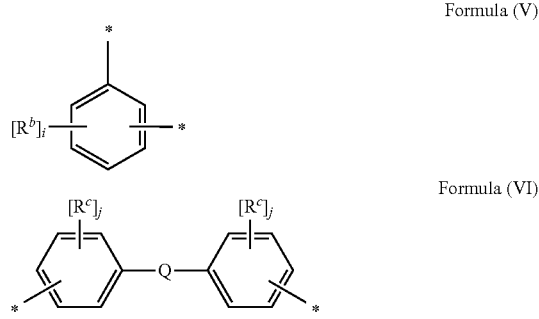

Formula (V)

Formula (VI)

in which Q is selected from alkylene, oxygen, sulfur, sulfoxide, sulfone and a direct, covalent bond and i and j independently of each other denote a number from 0 to 4, in particular 0 or 1.

If present, residues $R^b$ and $R^c$, each of which replaces a hydrogen atom of the aromatic ring system, are selected independently of one another from halogen, in particular fluorine, chlorine, bromine or iodine, $C_{1-40}$ alkyl, for instance methyl, ethyl, isopropyl, $C_{2-40}$ alkenyl, $C_{1-40}$ alkoxyl and $C_{7-13}$ aralkyl. Residue $R^b$ in formula (V) can also be a divalent residue that makes a corresponding naphthyl group from the phenyl group. In certain embodiments of the present invention residues $R^b$ and $R^c$, if present, comprise at least one further structural element of the general formula (I).

Within the context of the present invention an "alkylene group Q" is understood to refer to divalent alkyl residues, i.e. alkyls that can still bond on both sides. Preferred alkylene residues are for example substituted or unsubstituted, saturated or unsaturated alkylene residues having 1 to 40 C atoms. Preferred compounds are selected from for example —CH$_2$— (methylene), —CH$_2$—CH$_2$— (ethylene), —CH$_2$—CH$_2$—CH$_2$-(propylene), —CH$_2$—CH$_2$—CH$_2$—CH$_2$— (butylene), —CH$_2$—CH$_2$—CH$_2$—CH$_2$—CH$_2$— (hexylene), —CH$_2$—CH$_2$—CH$_2$—CH$_2$—CH$_2$—CH$_2$— (heptylene), —CH$_2$—CH$_2$—CH$_2$—CH$_2$—CH$_2$—CH$_2$—CH$_2$—CH$_2$-(octylene), but also from the branched derivatives thereof, such as isopropylene, tert-butylene.

The alkylene group Q can be mono- or polysubstituted. Suitable substituents can be selected for example from halogen, in particular chlorine, bromine or fluorine, trifluoromethyl, $C_{1-18}$ alkyl, $C_{3-8}$ cycloalkyl, $C_{2-18}$ alkenyl, $C_{2-18}$ alkynyl, heteroalkyl, heterocycloalkyl, $C_{1-18}$ alkoxy, $C_{1-18}$ alkylsulfanyl, $C_{1-18}$ alkylsulfonyl, $C_{1-18}$ alkylsulfoxidyl, $C_{1-18}$ alkanoyl, $C_{1-18}$ alkanoyloxy, $C_{1-18}$ alkoxycarbonyl, $C_{1-18}$ alkylaminocarbonyl, $C_{1-18}$ alkylsulfanylcarbonyl, sulfanyl, cyano, amino, heteroaryl, heteroaryl($C_{1-12}$ alkyl), heteroaryloxy, heteroarylamino, heteroarylsulfanyl, heteroarylsulfonyl, heteroarylsulfoxidyl, heteroarylcarbonyl, heteroarylcarbonyloxy, heteroaryloxycarbonyl, heteroarylaminocarbonyl, heteroarylsulfanylcarbonyl, $C_{1-18}$ alkoxysulfonyl, $C_{1-18}$ alkoxycarbinol, sulfo, sulfino, sulfeno, formyl, thioformyl, preferably from halogen, $C_{1-18}$ alkyl, $C_{2-18}$ alkenyl, $C_{2-18}$ alkynyl and $C_{1-18}$ alkoxy.

Suitable commercially available aromatic dihydroxyl compounds from which divalent residue K can be obtained by removing two aromatic hydroxyl groups, are listed by way of example below:

Hydroquinone, naphthalene diols, such as for instance 1,2-naphthalene diol, 2,6-naphthalene diol, 2,7-naphthalene diol, bis-(4-hydroxyphenyl), 2,2-bis-(4-hydroxyphenyl)propane, bis-(4-hydroxyphenyl)sulfide, bis-(4-hydroxyphenyl)ether, bis-(4-hydroxyphenyl)ketone, bis-(4-hydroxyphenyl)sulfone, bis-(4-hydroxyphenyl)methane, 1,1-bis-(4-hydroxyphenyl)cyclohexane, α,α'-bis-(4-hydroxyphenyl)-p-diisopropylbenzene, 1,1-bis-(4-hydroxyphenyl)-1-phenylethane, 2,2-bis-(3-methyl-4-hydroxyphenyl)propane, 2,2-bis-(3,5-dichloro-4-hydroxyphenyl)propane, 2,2-bis-(3,5-dibromo-4-hydroxyphenyl)propane, 2,2-bis-(3,5-dimethyl-4-hydroxyphenyl)propane, bis-(3,5-dimethyl-4-hydroxyphenyl)methane, 2,2-bis-(3,5-dimethyl-4-hydroxyphenyl)butane, bis-(3,5-dimethyl-4-hydroxyphenyl) and 1,1,3,4,6-pentamethyl-3-(3,5-dimethyl-4-hydroxyphenyl)indan-5-ol, particularly preferably bis-(4-hydroxyphenyl), 2,2-bis-(4-hydroxyphenyl)propane and 2,2-bis-(3,5-dimethyl-4-hydroxyphenyl)propane, bisphenol TMC, most particularly preferably 2,2-bis-(4-hydroxyphenyl)propane.

Divalent residue L is formally obtained by removing two terminal hydroxyl groups from polyethers. Preferred residues L in each repeating unit and in each of the formulae (I), (II) and optionally (IV) are selected independently of one another from divalent residues of the general formula (VII),

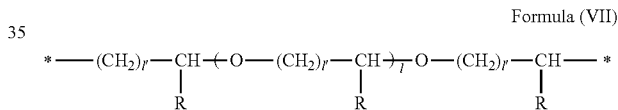

Formula (VII)

in which I denotes a number from 0 to 5000, each I' in formula (VII) and in each repeating unit independently denotes a number from 1 to 10, each R in formula (VII) and in each repeating unit is independently selected from hydrogen or linear or branched optionally substituted $C_{1-12}$ alkyl groups, R denoting hydrogen or methyl in particular.

In preferred divalent residues of the general formula (VII) I denotes a number from 1 to 200, preferably a number from 3 to 50 and particularly preferably a number from 5 to 20 and/or I' in formula (VII) and in each repeating unit independently denotes 1, 2, 3, 4, 5, 6, 7 or 8, in particular 1 or 3.

In order to achieve an effective impact modification, it is advantageous for each residue L to have a weight-average molecular weight ($M_w$) from 200 to 10,000 g/mol, preferably from 300 to 5000 g/mol and in particular from 500 to 2000 g/mol, prior to removal of two terminal hydroxyl groups. It is furthermore advantageous for each residue L to have a glass transition temperature ($T_g$) of less than 20° C., preferably less than 10° C. and particularly preferably less than 0° C., prior to removal of two terminal hydroxyl groups.

Within the context of the present invention the weight-average molecular weight ($M_w$) is determined by gel permeation chromatography (GPC) using polystyrene as the standard. Within the context of the present invention the glass transition temperature ($T_g$) is determined by dynamic mechanical thermal analysis (DMTA), the individual glass transition temperature being obtained from the maximum value of the graph plotting loss modulus against temperature.

The oligomeric or polymeric urethane group-free polyether compound of the present invention is obtainable by reacting at least one component A with at least one component B, component A being selected from the group consisting of (A-1) aromatic compounds having at least two aromatic hydroxyl, carboxyl, amino or thiol groups and (A-2) polyethers having at least two terminal hydroxyl, carboxyl, amino or thiol groups, and component B being selected from the group consisting of (B-1) polyethers having at least two terminal oxirane, aziridine or thiirane groups and (B-2) aromatic compounds of the general formula (VIII)

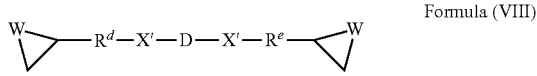

Formula (VIII)

in which each residue $R^d$ and $R^e$ independently denotes a divalent group of compounds comprising 1 to 100 C atoms, each residue X' is independently selected from —O—, —S—, —NH— or a carboxyl group of the general form —(C=O)O—, in which the C atom of the carboxyl group is always connected to the residue D, W is selected from —O—, —S— or —NH— and the residue D comprises at least one aromatic group, with the proviso that the exclusive reaction of one or more component(s) satisfying the definition of (A-1) with one or more component(s) satisfying the definition of (B-2) and the exclusive reaction of one or more component(s) satisfying the definition of (A-2) with one or more component(s) satisfying the definition of (B-1) is excluded.

Thus in the production of the oligomeric or polymeric urethane group-free polyether compound one or more component(s) A is/are reacted with one or more component(s) B, each component used having a different chemical structure.

Within the meaning of the present invention the term "exclusive reaction" is understood to mean that the reaction of two components takes place without at least one component being present in the reaction that satisfies none of the definitions of the aforementioned components.

Thus within the meaning of the present invention the reaction of one or more components satisfying the definition of (A-1) with one or more components satisfying the definition of (B-2) is excluded only in the case where no component is present in the reaction that does not satisfy the definition of (A-1) and (B-2).

Furthermore within the meaning of the present invention the reaction of one or more components satisfying the definition of (A-2) with one or more components satisfying the definition of (B-1) is excluded only in the case where no component is present in the reaction that does not satisfy the definition of (A-2) and (B-1).

The aforementioned exclusive reactions are excluded within the context of the present invention because the resulting reaction products provide only an inadequate improvement in the fracture-mechanical properties of the cured polymerizable compositions. Within the meaning of the present invention it thus appears to be necessary for the oligomeric or polymeric urethane group-free polyether compounds to comprise both aromatic and polyether-based structural elements in order to be effective as toughening agents in a cured benzoxazine matrix.

In the reaction of the individual components with one another, hydroxyl, carboxyl, amino and/or thiol groups of one component react in particular with terminal oxirane, aziridine or thiirane groups of another component to form an oligomeric or polymeric urethane group-free polyether compound.

Depending on the reactivity of the individual components, the reaction described preferably takes place at temperatures from 20 to 250° C., for instance at 100° C. to 180° C. The reaction time is likewise dependent on the reactivity of the components used and is preferably 10 min to 12 h, in particular 1 h to 6 h, wherein the reaction can be performed in a suitable solvent, such as for example toluene, or without solvent.

In a preferred embodiment of the present invention the reaction of the individual components is performed in the presence of at least one suitable catalyst. Suitable catalysts accelerate the reaction of hydroxyl, carboxyl, amino and/or thiol groups with terminal oxirane, aziridine or thiirane groups and are selected in particular from tetraalkyl ammonium salts, such as for example tetrabutyl ammonium bromide, tertiary amines, such as for example 1,8-diazabicyclo[5.4.0]undec-7-ene (DBU), aryl/alkyl phosphines, such as for example triphenylphosphine, or ureas, such as for example Versamine EH-50.

In a further preferred embodiment of the present invention the reaction of the individual components is performed in the presence of at least one crosslinking agent. Suitable crosslinking agents can be selected for example from diols, triols, tetraols and polyols having at least five hydroxyl groups.

Within the context of the present invention preferred components (A-1) are selected from compounds of the general formula (VIa),

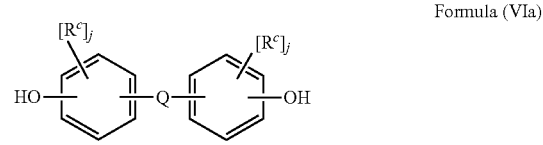

Formula (VIa)

in which j, Q and $R^c$ are as defined in formula (VI).

Preferred components (A-1) can also be selected from compounds of the general formula (Va),

Formula (Va)

in which i and $R^b$ are as defined in formula (V).

Within the context of the present invention it is advantageous in particular to select component (A-1) from aromatic compounds having two aromatic hydroxyl groups. Suitable aromatic compounds having two aromatic hydroxyl groups are for example hydroquinone, naphthalene diols, such as for instance 1,2-naphthalene diol, 2,6-naphthalene diol, 2,7-naphthalene diol, bis-(4-hydroxyphenyl), 2,2-bis-(4-hydroxyphenyl)propane, bis-(4-hydroxyphenyl)sulfide, bis-(4-hydroxyphenyl)ether, bis-(4-hydroxyphenyl)ketone, bis-(4-hydroxyphenyl)sulfone, bis-(4-hydroxyphenyl)methane, 1,1-bis-(4-hydroxyphenyl)cyclohexane, α,α'-bis-(4-hydroxyphenyl)-p-diisopropylbenzene, 1,1-bis-(4-hydroxyphenyl)-1-phenylethane, 2,2-bis-(3-methyl-4-hydroxyphenyl)propane, 2,2-bis-(3,5-dichloro-4-hydroxyphenyl)propane, 2,2-bis-(3,5-dibromo-4-hydroxyphenyl)propane, 2,2-bis-(3,5-dimethyl-4-hydroxyphenyl)propane, bis-(3,5-dimethyl-4-hydroxyphenyl)methane, 2,2-bis-(3,5-dimethyl-4-hydroxyphenyl)butane, bis-(3,5-dimethyl-4-hydroxyphenyl) and 1,1,3,4,6-pentamethyl-3-(3,5-dimethyl-4-hydroxyphenyl)indan-5-ol, particularly preferably bis-(4-hydroxyphenyl), 2,2-bis-(4-hydroxyphenyl)propane and 2,2-bis-(3,5-dimethyl-4-hydroxyphenyl)propane, bisphenol TMC, most particularly preferably 2,2-bis-(4-hydroxyphenyl)propane.

Component (A-2) denotes polyethers having at least two terminal hydroxyl, carboxyl, amino or thiol groups, polyethers being preferred in particular that have at least two terminal hydroxyl groups.

In a preferred embodiment of the invention component (A-2) is selected from non-aromatic polyethers having at least two terminal hydroxyl, carboxyl, amino or thiol groups, non-aromatic polyethers having at least two terminal hydroxyl groups being particularly preferred. Within the meaning of the present invention the term "non-aromatic polyethers" is understood to mean polyethers that comprise no aromatic structural element.

Preferred components (A-2) are selected from compounds of the general formula (IX), P[—OH]$_m$  Formula (IX)

in which m is a number from 2 to 100 and P denotes an m-valent polyalkylene oxide residue, such as for example an m-valent non-aromatic polyalkylene oxide residue. m is preferably a number from 2 to 50, particularly preferably from 2 to 10 and most particularly preferably from 2 to 4, wherein in particular m denotes 2. The m-valent polyalkylene oxide residue P can have a linear or branched structure.

Through the use of polyethers having two terminal hydroxyl groups as component (A-2), oligomeric or polymeric urethane group-free polyether compounds having a linear structure can be synthesized that exhibit good compatibility with the benzoxazine matrix.

Through the use of polyethers having more than two terminal hydroxyl groups as component (A-2), oligomeric or polymeric urethane group-free polyether compounds having a branched structure can be synthesized.

Suitable components (A-2) can be selected for example from compounds of the general formula (VIIa),

Formula (VIIa)

HO—(CH$_2$)$_{l'}$—CH$-$($O$—(CH$_2$)$_{l'}$—CH$\frac{}{l}$$O$—(CH$_2$)$_{l'}$—CH—OH
       |                    |                    |
       R                    R                    R in which l, l' and R are as defined in formula (VII).

In order to achieve an effective impact modification it is advantageous for component (A-2) to be selected from polyethers having at least two terminal hydroxyl, carboxyl, amino or thiol groups with a weight-average molecular weight (M$_w$) from 200 to 10,000 g/mol, preferably from 200 to 10,000 g/mol, preferably from 300 to 5000 g/mol and in particular from 500 to 2000 g/mol. It is furthermore advantageous for component (A-2) to be selected from the aforementioned polyethers, wherein these have a glass transition temperature (T$_g$) of less than 20° C., preferably less than 10° C. and particularly preferably less than 0° C.

Component (B-1) denotes polyethers having at least two terminal oxirane, aziridine or thiirane groups, polyethers being preferred in particular that have at least two terminal oxirane groups.

In a preferred embodiment of the invention component (B-1) is selected from non-aromatic polyethers having at least two terminal oxirane, aziridine or thiirane groups, non-aromatic polyethers having at least two terminal oxirane groups being particularly preferred. The term "non-aromatic polyethers" is defined as above.

Component (B-1) is preferably selected from compounds of the general formula (X),

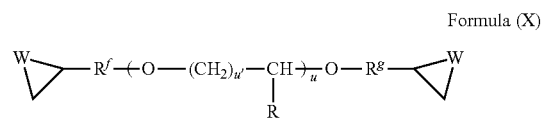

Formula (X)

in which u is a number from 2 to 5000, each u' in each repeating unit independently denotes a number from 1 to 10, each residue R$^f$ and R$^g$ independently denotes a divalent group of compounds comprising 1 to 100 C atoms, W is selected from —O—, —S— or —NH—, and each R in formula (X) and in each repeating unit is independently selected from hydrogen or linear or branched optionally substituted C$_{1-12}$ alkyl groups, R denoting hydrogen or methyl in particular.

In particular, u in formula (X) denotes a number from 1 to 200, preferably a number from 3 to 5 and particularly preferably a number from 5 to 20 and/or u' in formula (X) and in each repeating unit independently denotes 1, 2, 3, 4, 5, 6, 7 or 8, in particular 1 or 3.

In preferred embodiments of the present invention residues R$^f$ and R$^g$ in formula (X) are selected independently of each other from alkylene groups comprising 1 to 10 C atoms. In particular, residues R$^f$ and R$^g$ in formula (X) are selected independently of each other from linear alkylene groups comprising 1 to 6, in particular 1 or 2 carbon atoms, such as for example methylene and ethylene groups, R$^f$ and R$^g$ particularly preferably denoting a methylene group (—CH$_2$—).

Diglycidyl ethers of polyethers that are suitable as component (B-1) are available for example under the trade names DER-732, DER-736 (Dow Chemical Co.) or Adeka ED-506 (Adeka Corporation) or can be produced by the reaction of polyether polyols with epichlorohydrin known to the person skilled in the art.

In a preferred embodiment of the invention component (B-2) is selected from compounds of the general formula (VIIIa),

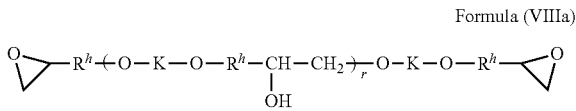

Formula (VIIIa)

in which r is a number from 0 to 10, R$^h$ in formula (VIIIa) and in each repeating unit is independently selected from alkylene groups comprising 1 to 10 C atoms and K in formula (VIIIa) and in each repeating unit independently denotes a divalent residue of aromatic dihydroxyl compounds following removal of both hydroxyl groups.

In a preferred embodiment of the invention r is a number from 0 to 2, in particular from 0 to 1, such as for example 0, 0.1, 0.2, 0.3, 0.4, 0.5, 0.6, 0.7, 0.8, 0.9, 1.

R$^h$ is selected in particular from linear alkylene groups comprising 1 to 6 carbon atoms, in particular 1 or 2 carbon atoms, such as for example methylene and ethylene groups, $R^f$ particularly preferably denoting a methylene group (—CH$_2$—).

Divalent residue K is formally obtained by removing two hydroxyl groups from aromatic dihydroxyl compounds and is as defined in formula (I).

Diglycidyl ethers of bisphenol A or bisphenol F, which are available for example under the trade names Epon 825, Epon 826, Epon 828, Epon 830, Epon 862, Epon 1001 (Hexion Specialty Chemicals Inc.) or DER-331, DER-332, DER-334 (Dow Chemical Co.) are suitable in particular as component (B-2).

The aforementioned compounds can also be produced by reacting one or more suitable bisphenolic compounds with epichlorohydrin.

Component (B-2) can furthermore be selected from compounds in which residue D in formula (VIII) comprises at least one aromatic group having at least one functional group of the following formula,

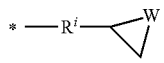

in which $R^i$ denotes a divalent group of compounds comprising 1 to 100 C atoms and W is selected from —O—, —S— or —NH—. In particular W denotes —O— and/or $R^i$ denotes an alkylene group having 1 to 10 C atoms, such as for example methylene or ethylene.

Suitable residues D in formula (VIII) can be selected for example from the following aromatic residues,

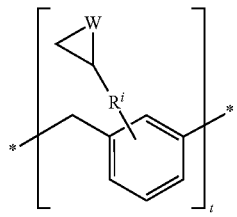

in which $R^i$ and W are as defined above and t is a number from 1 to 100,000, in particular from 1 to 10,000, particularly preferably from 1 to 1000.

Corresponding components (B-2) are for example glycidyl ethers of phenolic resins, such as for example glycidyl ethers of novolak resins.

In a preferred embodiment of the present invention the oligomeric or polymeric urethane group-free polyether compound is obtained by reacting at least one component (A-1) with at least one component (B-1) in the presence of at least one component (B-2).

The oligomeric or polymeric urethane group-free polyether compounds obtained in this way have a greater effectiveness as impact modifiers than comparable products obtained by the exclusive reaction of at least one component (A-1) with at least one component (B-1).

The molar ratio of the individual aforementioned components is preferably chosen in the reaction such that the oligomeric or polymeric urethane group-free polyether compound obtained has exclusively terminal oxirane, aziridine or thiirane groups, in particular exclusively terminal oxirane groups.

Within the meaning of the present invention it is advantageous for at least one oligomeric or polymeric urethane group-free polyether compound to be obtained by reacting at least one component A with at least one component B, component A being selected from the group consisting of (A-1) aromatic compounds having at least two aromatic hydroxyl, carboxyl, amino or thiol groups and (A-2) non-aromatic polyethers having at least two terminal hydroxyl, carboxyl, amino or thiol groups, and component B being selected from the group consisting of (B-1) non-aromatic polyethers having at least two terminal oxirane, aziridine or thiirane groups and (B-2) aromatic compounds of the general formula (VIII)

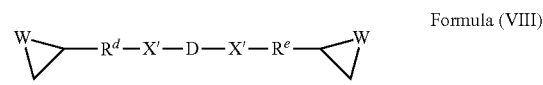

Formula (VIII)

in which each residue $R^d$ and $R^e$ independently denotes a divalent group of compounds comprising 1 to 100 C atoms, each residue X' is independently selected from —O—, —S—, —NH— or a carboxyl group of the general form —(C=O)O—, in which the C atom of the carboxyl group is always connected to the residue D, W is selected from —O—, —S— or —NH— and the residue D comprises at least one aromatic group, with the proviso that the exclusive reaction of one or more component(s) satisfying the definition of (A-1) with one or more component(s) satisfying the definition of (B-2) and the exclusive reaction of one or more component(s) satisfying the definition of (A-2) with one or more component(s) satisfying the definition of (B-1) is excluded.

As defined above, within the meaning of the present invention the term "non-aromatic polyethers" is understood to mean polyethers that comprise no aromatic structural element.

The aforementioned oligomeric or polymeric urethane group-free polyether compound makes it possible to produce polymerizable compositions that in the cured state exhibit particularly good fracture-mechanical properties.

Within the meaning of the present invention it is advantageous in particular to react at least one component (A-1), selected from compounds of the general formula (VIa),

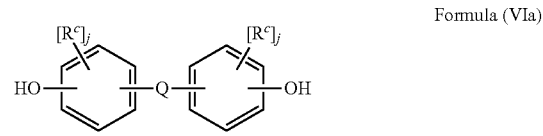

Formula (VIa)

in which j denotes a number from 0 to 4; Q is selected from the group consisting of alkylene, oxygen, sulfur, sulfoxide, sulfone and a direct, covalent bond and each residue $R^c$ is independently selected from halogen, in particular fluorine, chlorine, bromine or iodine, $C_{1-40}$ alkyl, for instance methyl, ethyl, isopropyl, $C_{2-40}$ alkenyl, $C_{1-40}$ alkoxyl and $C_{7-13}$ aralkyl, with at least one component (B-1), selected from compounds of the general formula (Xa),

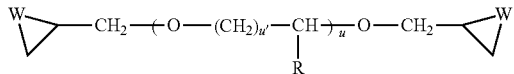
Formula (Xa)

in which u is a number from 2 to 5000, each u' in each repeating unit independently denotes a number from 1 to 10, W and z are each independently selected from —O—, —S— or —NH—, and each R in formula (XIa) and in each repeating unit is independently selected from hydrogen or linear or branched optionally substituted $C_{1-12}$ alkyl groups, R denoting hydrogen or methyl in particular,
in the presence of at least one component (B-2), component (B-2) being selected from compounds of the general formula (VIIIb),

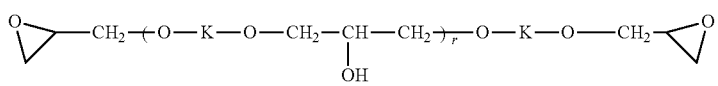
Formula (VIIIb)

in which r is a number from 0 to 10 and K in formula (VIIIb) is as defined in formula (I).

The molar ratio of component (A-1) to component B (B-1+ B-2) is in particular between 1:1.01 and 1:1.6, preferably between 1:1.1 and 1:1.3.

The polymerizable composition according to the invention can contain one or more of the oligomeric or polymeric urethane group-free polyether compounds described in amounts from 2 to 60 wt. %, preferably from 5 to 40 wt. % and extremely preferably from 10 to 30 wt. %, relative in each case to the total amount of the polymerizable composition.

In a preferred embodiment the polymerizable composition comprises only one or more benzoxazine compounds as the polymerizable resin component. For certain application purposes it can however be advantageous for the polymerizable composition additionally to contain further polymerizable resin components. Suitable compounds can be selected for example from the group of epoxy resins, polyurethane resins, polyester resins, polyamide resins or phenolic resins or from any mixtures thereof.

Within the context of the present invention an "epoxy resin" is understood to be a resin composition formed on the basis of epoxide compounds or epoxide-containing compounds. Within the meaning of the present invention all oligomeric or polymeric urethane group-free polyether compounds of the present invention are explicitly excluded from the designation "epoxy resin", even if they contain terminal oxirane groups.

In a preferred embodiment of the invention the epoxide compounds or epoxide-containing compounds of the epoxy resin system of the polymerizable preparation can comprise both oligomeric and monomeric epoxide compounds and epoxides of the polymeric type and can be aliphatic, cycloaliphatic, aromatic or heterocyclic compounds. Suitable epoxy resins within the context of the present invention are for example preferably selected from epoxy resins of the bisphenol A type, epoxy resins of the bisphenol S type, epoxy resins of the bisphenol F type, epoxy resins of the phenol-novolak type, epoxy resins of the cresol-novolak type, epoxidized products of numerous dicyclopentadiene-modified phenolic resins, obtainable by reacting dicyclopentadiene with numerous phenols, epoxidized products of 2,2',6,6'-tetramethylbisphenol, aromatic epoxy resins such as epoxy resins having a naphthalene framework and epoxy resins having a fluorene framework, aliphatic epoxy resins, alicyclic epoxy resins such as 3,4-epoxycyclohexylmethyl-3,4-epoxycyclohexane carboxylate and bis(3,4-epoxycyclohexyl)adipate and epoxy resins having at least one heterocyclic ring.

The epoxy resins comprise in particular octadecylene oxide, styrene oxide, vinyl cyclohexene oxide, glycidol, vinyl cyclohexene dioxide, 3,4-epoxycyclohexylmethyl-3,4-epoxycyclohexene carboxylate, 3,4-epoxy-6-methylcyclohexylmethyl-3,4-epoxy-6-methylcyclohexene carboxylate, bis(3,4-epoxy-6-methylcyclohexylmethyl)adipate, bis(2,3-epoxycyclopentyl)ether, aliphatic dipentene dioxide, epoxidized polybutadiene (e.g. Krasol products from Sartomer), silicone resin containing epoxy functionalities, flame-retardant epoxy resins (e.g. "DER-580"), bis(3,4-epoxycyclohexyl)adipate, 2-(3,4-epoxycyclohexyl-5,5-spiro-3,4-epoxy) cyclohexane metadioxane, vinyl cyclohexene monoxide and 2-epoxyhexadecane.

Particularly preferred epoxy resins within the meaning of the present invention are cycloaliphatic epoxy resins that are available commercially for example under the trade name CY179 (Huntsman), ACHWL CER 4221 (Achiewell, LLC) or Cyracure 6105/6110 (DOW Chemical).

In a preferred embodiment the polymerizable preparation according to the invention comprises a mixture of a plurality of the aforementioned epoxy resins.

The proportion of the epoxy resin or of the mixture of a plurality of epoxy resins relative to the total amount of the polymerizable preparation is preferably 5 to 50 wt. %, particularly preferably 10 to 30 wt. % and extremely preferably 15 to 25 wt. %.

In addition to the aforementioned oligomeric or polymeric urethane group-free polyether compounds, the compositions according to the invention generally also contain additives, such as for example ground or precipitated chalks, carbon black, calcium magnesium carbonates, barytes, and in particular silica fillers of the aluminum magnesium calcium silicate type, for example wollastonite or chlorite.

The compositions according to the invention can furthermore contain other additives such as for example plasticizers, reactive thinners, further impact modifiers, rheology aids, wetting agents, antioxidants, stabilizers and/or colored pigments. The compositions are however preferably free from plasticizers.

Preferred compositions according to the invention comprise, relative to the total amount of the polymerizable composition:
  i) 50 to 90 wt. % of at least one benzoxazine compound,
  ii) 10 to 40 wt. % of at least one oligomeric or polymeric urethane group-free polyether compound,
  iii) 0 to 20 wt. % of at least one epoxy resin, in particular at least one cycloaliphatic epoxy resin, and
  iv) 0 to 20 wt. % of at least one additive.

The present invention also provides the polymerization product of the polymerizable composition according to the invention.

Through the use of the oligomeric or polymeric urethane group-free polyether compounds in the polymerizable composition an effective impact modification of the cured product is achieved.

As compared with unmodified benzoxazine-based polymerization products, in other words those comprising no oligomeric or polymeric urethane group-free polyether compounds, a significant increase in the critical stress intensity factor K1c and the critical energy release rate G1c is generally achieved.

The flexural strength and flexural modulus can be determined in accordance with ASTM D790, wherein in each case a specimen of dimensions 90 mm×12.7 mm×3.2 mm, span=50.8 mm and a speed of 1.27 mm/min can be used. The critical stress intensity factor K1c and the critical energy release rate G1c can be determined in accordance with ASTM D5045-96 using the single etch notch bending method (SENB), wherein in each case a specimen of dimensions 56 mm×12.7 mm×3.2 mm can be used.

Polymerization of the polymerizable benzoxazine compound or the mixture of various polymerizable benzoxazine compounds can take place at elevated temperature by means of a self-initiating mechanism (thermal polymerization) or by addition of cationic initiators.

Suitable cationic initiators are for example Lewis acids or other cationic initiators, such as for example metal halides, organometallic reagents, such as metalloporphyrins, methyl tosylates, methyl triflates or trifluorosulfonic acids. Basic reagents can likewise be used to initiate polymerization of the polymerizable benzoxazine compound or the mixture of various polymerizable benzoxazine compounds. Suitable basic reagents can be selected for example from imidazole or imidazole derivatives.

Thermal polymerization of the polymerizable composition according to the invention preferably takes place at temperatures from 150 to 300° C., in particular at temperatures from 160 to 220° C. Through the use of the aforementioned initiators and/or other reagents the polymerization temperature can also be lower.

In a preferred embodiment of the invention the polymerization product according to the invention incorporates a layer or a bundle of fibers, wherein the fibers are treated prior to curing (polymerization) with the polymerizable composition according to the invention. The subsequent curing results in a fiber-reinforced composite material.

The present invention therefore also provides a method for producing a polymerization product of the polymerizable composition according to the invention, wherein the cited composition incorporates a layer or a bundle of fibers and the fibers are treated prior to curing with the polymerizable composition according to the invention.

The method according to the invention comprises the following steps:
a) provision of a layer or a bundle of fibers;
b) provision of the polymerizable composition according to the invention;
c) production of a composite system by treating a layer or a bundle of fibers with the polymerizable composition according to the invention;
d) optional removal of an excess amount of the polymerizable composition from the composite system,
the cited polymerization product being obtained by exposing the composite system to elevated temperature and preferably elevated pressure.

Within the meaning of the invention the term "elevated temperature" is understood to mean in particular temperatures from 40° C. to 300° C., preferably from 50° C. to 280° C. and particularly preferably from 80° C. to 250° C.

The cited fibers are preferably selected from glass fibers, carbon fibers, aramid fibers, boron fibers, aluminum oxide fibers, silicon carbide fibers. Two or more of these fibers can be used as a mixture. The use of carbon fibers is particularly preferred in order to produce a product that is relatively low in weight and has a relatively long lifetime.

Within the meaning of the present invention the layer or bundle of fibers is not tied to a defined form or alignment and so for example long fibers laid parallel to one another in one direction, tow yarns, woven fabric (cloth), mats, knitted fabric or lace can be used.

By virtue of their low weight and high structural strength the composite systems in the form of fiber-reinforced composite materials produced by the cited method according to the invention can be used for example in aircraft construction or in the automotive industry.

Any known production method from the prior art can generally be used for the production of the fiber-reinforced composite materials of the present invention.

In one widely-used method for producing fiber-reinforced composite materials, prepregs or towpregs made from fibers (reinforcing fibers) and uncured polymerizable compositions are produced as an intermediate, which can then be manually laminated and heat-cured.

In the resin transfer molding method (RTM), a liquid, heat-curable polymerizable composition is injected into a reinforcing fiber substrate located in a mold and this is then heat-cured in order to obtain a fiber-reinforced composite material.

In generally known RTM methods a liquid, heat-curable polymerizable composition is injected under pressure into a reinforcing fiber substrate located in a closed mold or into a reinforcing fiber substrate located in an open mold, covered with a vacuum bag and a vacuum applied in order to inject the polymerizable composition, the latter method being known as vacuum-assisted resin transfer molding (VaRTM).

The present invention also provides an adhesive, sealant or coating agent comprising the polymerizable composition according to the invention.

The present invention likewise provides the use of one or more of the aforementioned oligomeric or polymeric urethane group-free polyether compounds as impact modifiers for a polymerization product containing at least one polymerizable benzoxazine compound in polymerized form.

The following examples serve to illustrate the invention in more detail.

EMBODIMENT EXAMPLES

1) Production of Oligomeric or Polymeric Urethane Group-Free Polyether Compounds The following substances were used to produce the oligomeric or polymeric urethane group-free polyether compounds:
Bisphenol A 2,2-Bis-(4-hydroxyphenyl) propane (BisA), Aldrich
DER 732 Polypropylene glycol diglycidyl ether, Dow Chemical Company
DER 736 Polypropylene glycol diglycidyl ether, Dow Chemical Company
DER 331 Bisphenol A epoxy resin, Dow Chemical Company
DEN 431 Epoxy novolak resin, Dow Chemical Company Araldite MY 0510 (p-Aminophenol) triglycidyl ether, Huntsman A mixture consisting of bisphenol A (component A-1) and DER 732 or DER 736 (component B-1) was placed in a reaction vessel. In some cases DER 331 (component B-2) was also added to the reaction mixture. After adding tetrabutyl ammonium bromide (0.3 wt. %) as a catalyst the reaction mixture was heated to 150° C. for 1.5 to 5 h while stirring. The product was then transferred to a vessel and covered with a lid.

The oligomeric or polymeric urethane group-free polyether compounds produced by the procedure described above are shown in Table 1 with details of the molar ratios of the individual components in the production of the cited polyether compounds.

TABLE 1

Molar ratios of individual components in the production of oligomeric or polymeric urethane group-free polyether compounds Molar proportions of individual components in the production of polyether compounds

| Polyether compound | DER 732 | DER 736 | MY 0510 | DER 431 | DER 331 | BisA |
|---|---|---|---|---|---|---|
| #1 | 3 | — | — | — | — | 2 |
| #2 | 2 | — | — | — | — | 3 |
| #3 | 5 | — | — | — | — | 4 |
| #4 | — | 5 | — | . | — | 4 |
| #5 | 2.5 | — | — | — | 2.5 | 4 |
| #6 | 2.72 | — | — | — | 2.27 | 4 |
| #7 | 2.27 | — | — | — | 2.72 | 4 |
| #8 | 2.5 | — | — | — | 2.5 | 4 |
| #9 | 2.5 | — | — | — | 2.5 | 3.9 |
| #10 | 2.5 | — | — | — | 2.5 | 3.8 |
| #11 | 4 | — | — | — | — | 3 |
| #12 | 3.58 | — | — | — | 1.96 | 4 |
| #13 | 3 | — | — | — | 2 | 4 |
| #14 | 2.5 | — | — | 0.33 | 2.17 | 4 |
| #15 | 2.5 | — | 0.58 | — | 1.92 | 4 |
| #16 (ref.) | only DER 732 as additive | | | | | |

2) Production of the Polymerizable Composition

A mixture of two benzoxazine compounds (Box) consisting, relative to the total weight of the mixture, of 60 wt. % Box-I and 40 wt. % Box-II, was used as the benzoxazine compound.

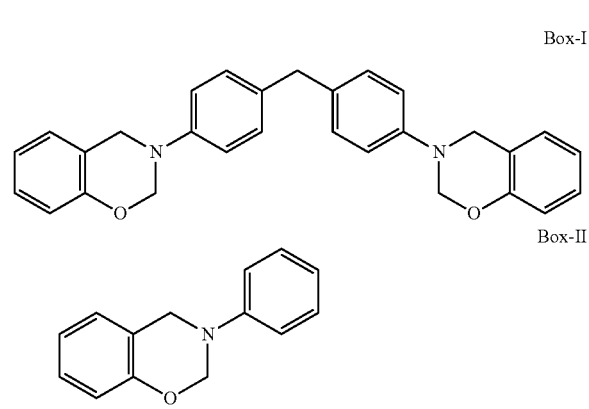

Box-I

Box-II

The polymerizable composition was produced in a 500-ml reaction flask. 120 g of the benzoxazine compound (Box) shown above and 40 g of the cycloaliphatic epoxy resin CER 4221 (Achiewell) were placed in this flask. The corresponding amount of the oligomeric or polymeric urethane group-free polyether compounds and optionally a curing catalyst (diethylamine salt of trifluoromethane sulfonic acid, Nacure Super A233, King Industries) was added while stirring.

The mixture was homogenized under vacuum (<10 mbar) at 80° C. while stirring for 15 to 30 minutes and then stored in closed containers.

Table 2 shows the proportions of the individual constituents in the polymerizable compositions, relative in each case to the total amount of the polymerizable composition.

TABLE 2

Polymerizable compositions

| Polymerizable composition | Box [wt. %] | CER 4221 [wt. %] | Polyether compound or reference compound | Nacure Super A233 [wt. %][a] |
|---|---|---|---|---|
| 1 (ref.) | 80 | 20 | — | — |
| 2 (ref.) | 80 | 20 | — | 1 |
| 2a (ref.) | 60 | 20 | #16, 20 wt. % | 1 |
| 3 | 60 | 20 | #1, 20 wt. % | — |
| 4 | 60 | 20 | #2, 20 wt. % | — |
| 5 | 60 | 20 | #3, 20 wt. % | — |
| 6 | 60 | 20 | #4, 20 wt. % | — |
| 7 | 60 | 20 | #5, 20 wt. % | — |
| 8 | 60 | 20 | #13, 20 wt. % | 1 |
| 9 | 60 | 20 | #6, 20 wt. % | — |
| 10 | 60 | 20 | #7, 20 wt. % | — |
| 11 | 63.75 | 21.25 | #8, 15 wt. % | 1 |
| 12 | 60 | 20 | #8, 20 wt. % | 1 |
| 13 | 56.25 | 18.75 | #8, 25 wt. % | 1 |
| 14 | 60 | 20 | #9, 20 wt. % | 1 |
| 15 | 60 | 20 | #10, 20 wt. % | 1 |
| 16 | 67.5 | 22.5 | #11, 10 wt. % | — |
| 17 | 60 | 20 | #12, 20 wt. % | 1 |
| 18 | 60 | 20 | #14, 20 wt. % | 1 |
| 19 | 60 | 20 | #15, 20 wt. % | 1 |

[a]The wt. % FIGURE for Nacure Super A233 is relative to the total amount of resin components (Box + CER 4221 + polyether compound)

3) Mechanical Data for the Polymerization Products of the Polymerizable Compositions The polymerizable compositions were thermally cured in an autoclave at 180° C. within 90 min. The cured specimens (polymerization products) were then cooled to room temperature and characterized by means of the following analytical methods.

The flexural strength and flexural modulus were determined in accordance with ASTM D790, wherein in each case a specimen of dimensions 90 mm×12.7 mm×3.2 mm, span=50.8 mm and a speed of 1.27 mm/min was used.

The critical stress intensity factor K1c and the G1c value (critical energy release rate) were determined in accordance with ASTM D5045-96 using the single etch notch bending method (SENB), wherein in each case a specimen of dimensions 56 mm×12.7 mm×3.2 mm was used.

The mechanical data for the polymerization products of the polymerizable compositions is shown in Table 3.

TABLE 3

Mechanical data for the polymerization products of the polymerizable compositions

| Data | Specimen | | | | | | | | | | |
|---|---|---|---|---|---|---|---|---|---|---|---|
| | 1 (ref.) | 2 (ref.) | 2a (ref.) | 3 | 4 | 5 | 6 | 7 | 8 | 9 | 10 | 11 |
| Flexural strength [MPa] | 139 | 133 | 149 | 120 | 141 | 144 | 152 | 135 | 134 | 148 | 158 | 157 |
| Flexural modulus [MPa] | 4100 | 4315 | 4040 | 3300 | 3860 | 2850 | 4140 | 3970 | 3455 | 4050 | 4075 | 4105 |
| K1c [MPa m$^{0.5}$] | 0.69 | 0.84 | 0.76 | 1.19 | 1.09 | 1.02 | 1.00 | 1.48 | 1.28 | 1.52 | 1.34 | 1.25 |
| G1c [J/m$^2$] | 103 | 145 | 128 | 377 | 270 | 342 | 211 | 488 | 416 | 503 | 385 | 337 |

| Data | Specimen | | | | | | | |
|---|---|---|---|---|---|---|---|---|
| | 12 | 13 | 14 | 15 | 16 | 17 | 18 | 19 |
| Flexural strength [MPa] | 148 | 152 | 150 | 151 | 139 | 148 | 153 | 164 |
| Flexural modulus [MPa] | 4035 | 4075 | 4100 | 4140 | 3715 | 3845 | 4285 | 4310 |
| K1c [MPa m$^{0.5}$] | 1.63 | 1.94 | 1.55 | 1.33 | 1.08 | 1.47 | 1.72 | 1.44 |
| G1c [J/m$^2$] | 576 | 821 | 511 | 377 | 273 | 496 | 609 | 429 |

Table 3 shows that the polymerization products according to the invention have very high K1c and G1c values and a high flexural modulus. The mechanical data shown thus demonstrates that the oligomeric or polymeric urethane group-free polyether compounds of the present invention are outstandingly suitable as impact modifiers for benzoxazine-based resin systems.

By contrast, the reference compositions (2a) containing only a polypropylene glycol diglycidyl ether (DER 732) as additive have markedly poorer fracture-mechanical properties.

The invention claimed is:

1. A polymerizable composition, comprising
i) at least one benzoxazine compound and
ii) at least one polyether compound, consisting of one or more structural elements of the general formula (I) having terminal groups independently selected from hydroxyl, carboxyl, amino, thiol, oxirane, aziridine or thiirane groups,

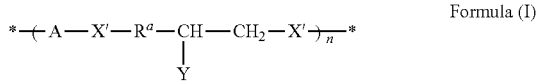

Formula (I)

in which n is a number from 5 to 10,000, each residue $R^a$ in each repeating unit independently denotes a divalent group of compounds comprising 1 to 100 C atoms, each residue X' in each repeating unit is independently selected from —O—, —S—, —NH— or a carboxyl group of the general form —(C=O)O—, in which the C atom of the carboxyl group is always connected to the residue A, each residue Y in each repeating unit is independently selected from —OH, —SH and —NH$_2$ and each residue A in each repeating unit is independently selected from K or L, K denoting a divalent residue of aromatic dihydroxyl compounds following removal of both hydroxyl groups and L denoting a divalent residue of polyethers following removal of two terminal hydroxyl groups, with the proviso that, relative to the total number of all residues A in the polyether compound, 20 to 80% of all residues A denote K and 20 to 80% of all residues A denote L, wherein the polyether compound is free of oligomeric or polymeric urethane groups.

2. The polymerizable composition according to claim 1, wherein the oligomeric or polymeric urethane group-free polyether compound is selected from compounds of the general formula (II),

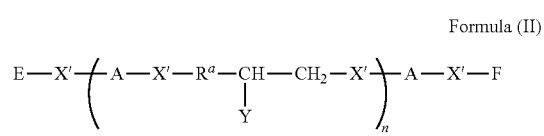

Formula (II)

in which E is selected from hydrogen or residues of the general formula (III),

Formula (III)

F is selected from hydrogen or residues of the general formula (IV),

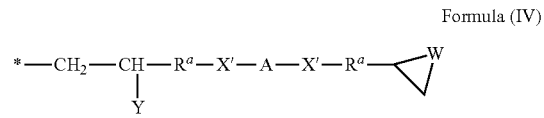

Formula (IV)

in which each residue W is independently selected from —O—, —S— or —NH— and the residues A, X', $R^a$ and Y and n are each as defined in claim 1.

3. The polymerizable composition according to claim 1, wherein each residue $R^a$ in formula (I), (II), (III) or (IV) independently denotes a methylene group.

4. The polymerizable composition according to claim 1, wherein each residue X' in formula (I), (II) or (IV) independently denotes —O—.

5. The polymerizable composition according to claim 1, wherein the residue Y in formula (I), (II) or (IV) denotes —OH.

6. The polymerizable composition according to claim 1, wherein the residue W in formula (III) or (IV) denotes —O—.

7. The polymerizable composition according to claim 1, wherein K denotes a residue selected from divalent residues of the general formula (V) or formula (VI),

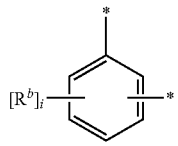

Formula (V)

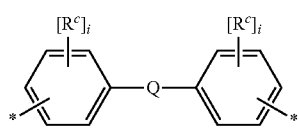

Formula (VI)

in which i and j independently of each other denote a number from 0 to 4, $R^b$ and $R^c$ are selected independently of each other from halogen, $C_{1-40}$ alkyl, $C_{2-40}$ alkenyl, $C_{1-40}$ alkoxyl or $C_{7-13}$ aralkyl or divalent residues that make a corresponding naphthyl structure from the phenyl structure, and Q is selected from alkylene, oxygen, sulfur, sulfoxide, sulfone or a direct, covalent bond.

8. The polymerizable composition according to claim 1, wherein L denotes a residue selected from divalent residues of the general formula (VII),

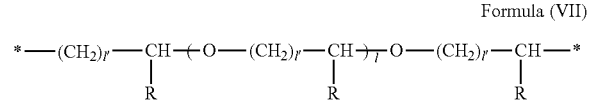

Formula (VII)

in which l denotes a number from 0 to 5000, each l' in formula (VII) and in each repeating unit independently denotes a number from 1 to 10, each R in formula (VII) and in each repeating unit is independently selected from hydrogen or linear or branched optionally substituted $C_{1-12}$ alkyl groups.

9. A polymerizable composition, comprising i) at least one benzoxazine compound and ii) at least one polyether compound, wherein the compound is free of oligomeric or polymeric urethane groups, obtainable by reacting at least one component A with at least one component B, component A being selected from the group consisting of (A-1) aromatic compounds having at least two aromatic hydroxyl, carboxyl, amino or thiol groups and (A-2) polyethers having at least two terminal hydroxyl, carboxyl, amino or thiol groups, and component B being selected from the group consisting of (B-1) polyethers having at least two terminal oxirane, aziridine or thiirane groups and (B-2) aromatic compounds of the general formula (VIII)

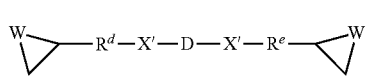

Formula (VIII)

in which each residue $R^d$ and $R^e$ independently denotes a divalent group of compounds comprising 1 to 100 C atoms, each residue X' is independently selected from —O—, —S—, —NH— or a carboxyl group of the general form —(C=O)O—, in which the C atom of the carboxyl group is always connected to the residue D, W is selected from —O—, —S— or —NH— and the residue D comprises at least one aromatic group, with the proviso that the exclusive reaction of one or more components satisfying the definition of (A-1) with one or more components satisfying the definition of (B-2) and the exclusive reaction of one or more components satisfying the definition of (A-2) with one or more components satisfying the definition of (B-1) is excluded.

10. The polymerizable composition according to claim 9, wherein the oligomeric or polymeric urethane group-free polyether compound has at least one terminal oxirane, aziridine and/or thiirane group and/or at least one terminal hydroxyl, amino or thiol group.

11. The polymerizable composition according to claim 9, wherein component (A-1) is selected from compounds of the general formula (VIa),

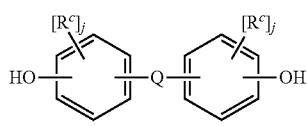

Formula (VIa)

in which j denotes a number from 0 to 4, $R^c$ is selected from halogen, $C_{1-40}$ alkyl, $C_{2-40}$ alkenyl, $C_{1-40}$ alkoxyl and $C_{7-13}$ aralkyl and Q is selected from the group consisting of alkylene, oxygen, sulfur, sulfoxide, sulfone and a direct, covalent bond.

12. The polymerizable composition according to claim 9, wherein component (A-2) is selected from compounds of the general formula (IX),

 Formula (IX)

in which m is a number from 2 to 100 and P denotes an m-valent polyalkylene oxide residue.

13. The polymerizable composition according to claim 9, wherein component (B-1) is selected from compounds of the general formula (X),

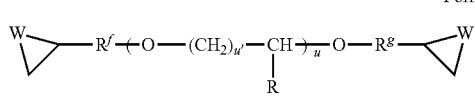

Formula (X)

in which u is a number from 2 to 5000, each u' in each repeating unit independently denotes a number from 1 to 10, each R in formula (X) and in each repeating unit is independently selected from hydrogen or linear or branched optionally substituted $C_{1-12}$ alkyl groups, each residue $R^f$ and $R^g$ independently denotes a divalent group of compounds comprising 1 to 100 C atoms and W is selected from —O—, —S— or —NH—.

14. The polymerizable composition according to claim 1, wherein the oligomeric or polymeric urethane group-free polyether compound has a weight-average molecular weight of 1000 to 100,000 g/mol.

15. A polymerization product of the polymerizable composition according to claim 1.

16. The polymerization product according to claim 15, wherein the polymerization product comprises a layer or a bundle of fibers, the fibers being treated prior to curing with a polymerizable composition according to claim 1.

17. A method for producing a polymerization product according to claim 16, comprising the following steps:
    a) provision of a layer or a bundle of fibers;
    b) provision of a polymerizable composition;
    c) production of a composite system by treating a layer or a bundle of fibers with the polymerizable composition;
    d) optional removal of an excess amount of the polymerizable composition from the composite system,
    wherein said polymerization product is obtained by exposing the composite system to elevated temperature.

18. An adhesive, sealant or coating comprising a polymerizable composition according to claim 1.

19. A polymerizable composition, comprising
    i) at least one benzoxazine compound and
    ii) as a toughening agent, from 5 to 40 wt. %, based on the total weight of the polymerizable composition, at least one polyether compound having a weight average molecular weight of from 1000 to 100,000 and comprising one or more structural elements of the general formula (I),

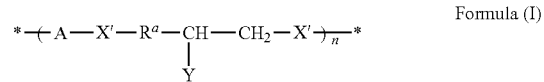

Formula (I)

in which n is a number from 5 to 10,000, each residue $R^a$ in each repeating unit independently denotes a divalent group of compounds comprising 1 to 100 C atoms, each residue X' in each repeating unit is independently selected from —O—, —S—, —NH— or a carboxyl group of the general form —(C=O)O—, in which the C atom of the carboxyl group is always connected to the residue A, each residue Y in each repeating unit is independently selected from —OH, —SH and —NH$_2$ and each residue A in each repeating unit is independently selected from K or L, K denoting a divalent residue of aromatic dihydroxyl compounds following removal of both hydroxyl groups and L denoting a divalent residue of polyethers following removal of two terminal hydroxyl groups, with the proviso that, relative to the total number of all residues A in the polyether compound, 20 to 80% of all residues A denote K and 20 to 80% of all residues A denote L, wherein the polyether compound is free of oligomeric or polymeric urethane groups.

* * * * *